Jan. 17, 1967  V. H. PAYNE  3,298,384
HYDRO-PNEUMATIC PRESSURE REGULATOR
Filed Jan. 24, 1964  2 Sheets-Sheet 1
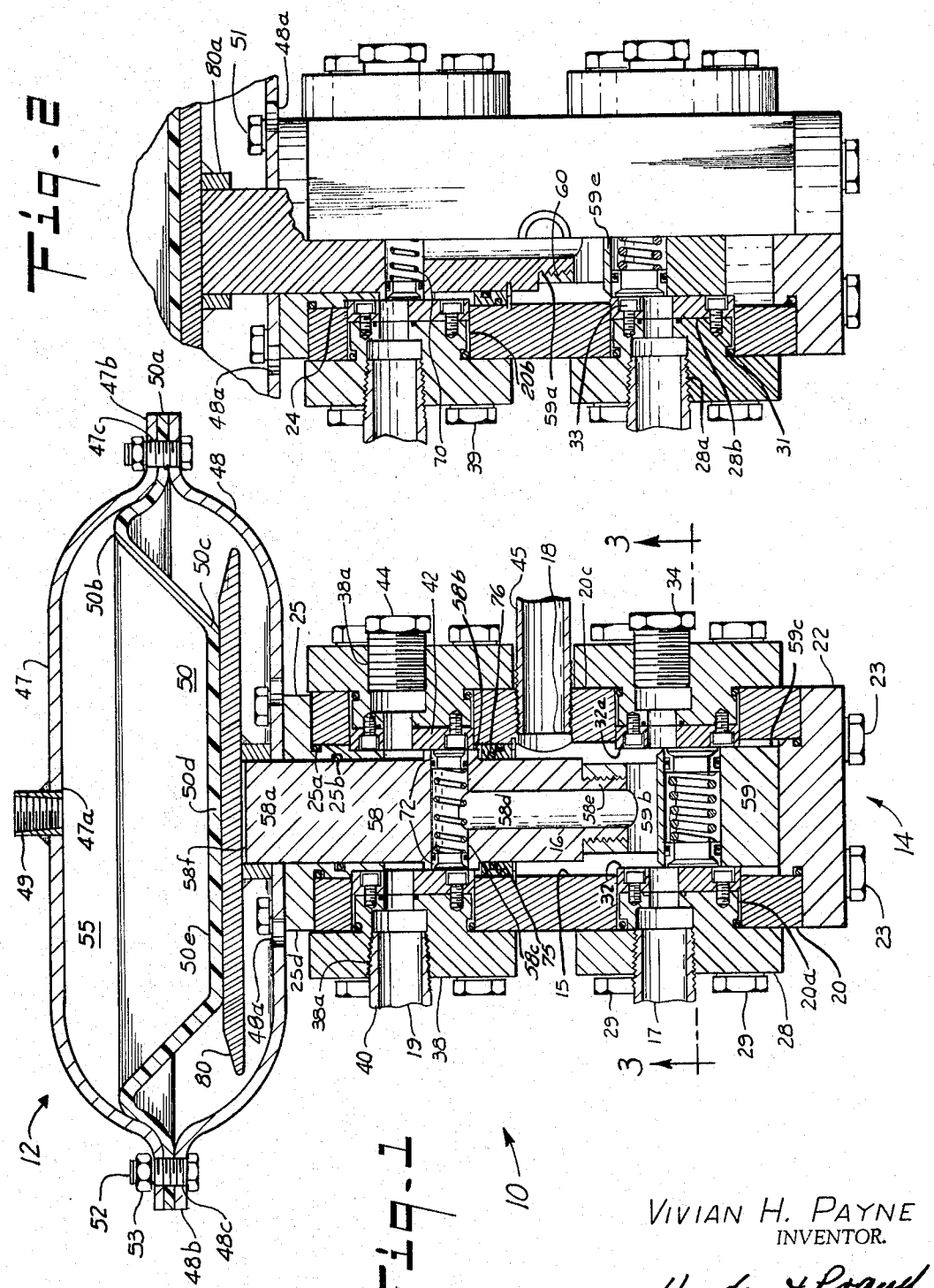
VIVIAN H. PAYNE
INVENTOR.
BY Hayden & Prandl
ATTORNEYS Jan. 17, 1967 V. H. PAYNE 3,298,384
HYDRO-PNEUMATIC PRESSURE REGULATOR
Filed Jan. 24, 1964 2 Sheets-Sheet 2

VIVIAN H. PAYNE
INVENTOR.

BY Hayden & Pravel

ATTORNEYS

United States Patent Office 3,298,384
Patented Jan. 17, 1967

3,298,384
HYDRO-PNEUMATIC PRESSURE REGULATOR
Vivian H. Payne, P.O. Box 9363, Houston, Tex. 77014
Filed Jan. 24, 1964, Ser. No. 339,963
1 Claim. (Cl. 137—102)

This invention relates to a high pressure hydro-pneumatic combination pressure reducing and relief regulator valve operable from remote locations through use of a low-pressure pneumatic control system for supplying pressure fluid from a pressure fluid source to a pressure fluid receiver at a controlled pressure, and more particularly to a valve utilizing only fluid pressures to open and close the valve with unsual sensitivity and repeatability to achieve regulated pressure in the pressure fluid receiver.

Fluid systems are often employed in various applications where it is desirable and sometimes necessary to control and regulate the pressure of the fluid within the system within selected limits. Such operation requires that a pressure regulation valve be installed between the pressure fluid source and the pressure fluid receiver to regulate the pressure as the fluid is conducted from the source to the receiver. In addition, various conditions in a pressure fluid receiver may cause fluid pressure build-ups downstream from the regulator valve so that such build-ups cause the pressure to exceed the selected level on the downstream side of the regulator valve. Valves of the type to which this invention relates include means for relieving the pressure on the downstream side of the valve to counteract downstream pressure build-ups to maintain the downstream pressure within certain desired limits.

Valves of the type to which this invention relates are less than satisfactory in many applications. For instance, it is often necessary at many plants and other such installations to accurately control the pressure of fluid in a system at a given location while the system as a whole is operated from a control board at a central location. Thus, if the regulated pressure needs changing, an employee must make an inconvenient and often dangerous trip to the location of the valve to adjust the valve to a new setting. Valves known in the prior art commonly use springs and spring-loaded devices to control the movement of the valve which spring characteristics cause many problems. Also, the high pressures often encountered in fluid systems and associated processes generally cause leakage in valves currently used and such leakage is eliminated only by resorting to the use of precision apparatus which requires extensive machining to a high level of quality. This invention provides a remotely operable combination pressure reducing and relief regulator valve which overcomes the above and other problems.

Therefore, an object of this invention is to provide a new and improved combination pressure reducing and relief regulator valve for supplying pressure fluid to a pressure fluid receiver operable by differential forces acting on the valve formed by pressure fluid which is unusually sensitive and has precise repeatability over a long period of time and through many cycles of operation.

A further object of this invention is to provide a new and improved combination pressure reducing and relief regulator valve requiring no springs in operation of the valve mechanism for supplying pressure fluid to a pressure fluid receiver which maintains its setting over a long period of time in repeated operations.

An important object of this invention is to provide a new and improved combination pressure reducing and relief regulator valve for supplying pressure fluid to a pressure fluid receiver which is accurately preset to a pressure level by varying pressure of a low pressure fluid supply which is connected to one side of a diaphragm mechanism to cause movement of a slide valve to control flow of pressure fluid through the valve.

Yet another object of this invention is to provide a new and improved combination pressure reducing and relief regulator valve which controls the flow of pressure fluid therethrough by closing off relief and inlet ports by positioning sliding seal rings over the ports.

Still a further object of this invention is to provide a new and improved combination pressure reducing and relief regulator valve which controls the fluid pressure level in a fluid pressure receiver by movements of a valve slidably positioned in a valve body wherein said movements are in response to pressure fluid in the body acting on one end of the valve and pressure fluid acting on pressure fluid responsive means having a ratio of about thirty to one relative to the end of the valve whereby the pressure fluid acting on the pressure fluid responsive means controls operation of the valve at a fraction of the pressure of the fluid supplied to the pressure fluid receiver.

Other objects and advantages of the present invention will become more readily apparent from consideration of the following description of the drawings wherein:

FIG. 1 is a sectional view of the valve, the valve body, the diaphragm and the pressure fluid ports of this invention illustrating the functional relationships thereof;

FIG. 2 is a view, partly in section and similar to FIG. 1, in which the valve is shifted relative to the valve body to illustrate various fluid connections made by the combination pressure reducing and relief regulator valve of this invention;

Figure 3:
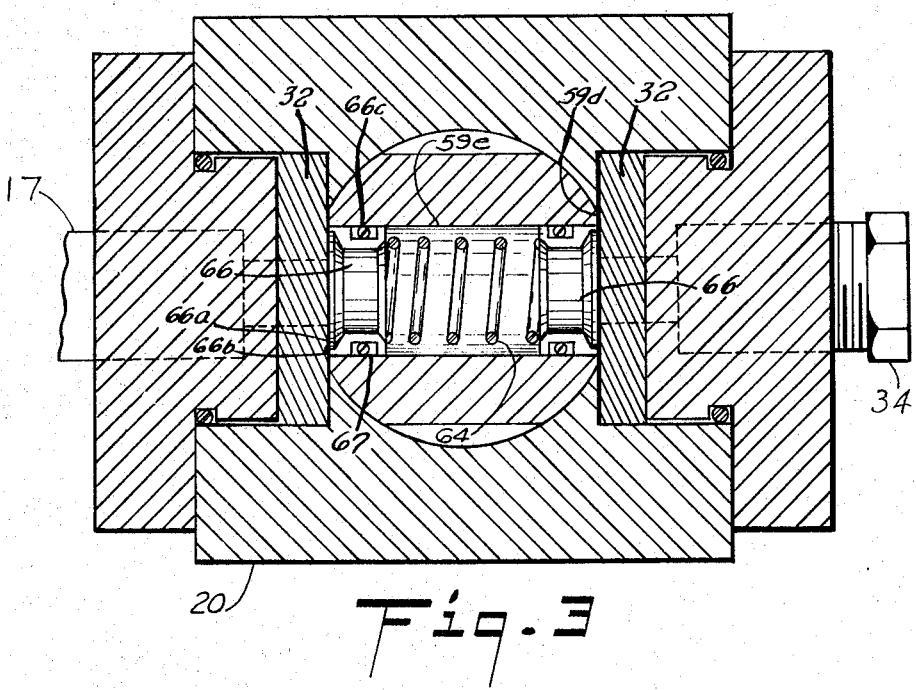
FIG. 3 is an enlarged sectional view taken along the line 3—3 of FIG. 1 illustrating the relationship of the sliding seal rings relative to the valve body and the sliding valve.

In the drawings, the numeral 10 generally designates the combination pressure reducing and relief regulator valve of this invention which includes pressure fluid responsive means designated generally at 12 which is connected to a valve body 14. The valve body 14 includes an internal passage defined by the inner wall 15 and a sliding valve 16 is positioned in the internal passage defined by the inner wall 15. An inlet port adapted for connection to a pressure fluid source is provided at 17 while an outlet port adapted for connection to a pressure fluid receiver is formed in the valve body at 18. The pressure fluid is admitted through the inlet port 17 dependent on the position of the sliding valve 16 which moves in response to differential forces acting on the valve 16 created by the pressure fluid responsive means 12 coupled to one end of the sliding valve 16 and the pressure fluid within the valve body 14 which acts on the opposite end of the sliding valve 16. Pressure fluid is admitted through the port 17 until a dynamic balance is achieved whereby the sliding valve 16 is positioned to close off the port 17 to further admission of pressure fluid at which time the pressure fluid at the outlet 18 is related to the pressure within the pressure fluid responsive means 12. Should the pressure in the outlet port 18 rise above the set pressure as determined by the pressure within the fluid pressure responsive means 12, the sliding valve 16 is repositioned to expose a relief port 19 which is adapted for connection to a pressure fluid sump in communication with the fluid within the valve body 14 whereby such fluid is vented to the pressure fluid sump through the port 19 to thereby regulate the pressure of the fluid in the pressure fluid receiver.

Considering the invention more in detail, the valve body 14 includes a body cylinder formed of longitudinally extending rectangular stock having the internal passage 15 centrally positioned therein and is identified by the number 20. The valve body 14 is sealed at the lower end by an end plate 22 which is attached to the valve body 14 by means such as the bolts identified at 23. The opposite end of the valve body 14 includes an enlarged bore 24 formed in the main body cylinder 20 in alignment with the internal passage 15 for receiving a top cylinder head 25. The top cylinder head 25 has formed therein annular slots 25a and 25b with the slot 25a positioned on the external surface of the top cylinder head 25 adjacent an outwardly extending bolt flange 25d and the annular slot 25b is located on the inner bore of the top cylinder head 25 adjacent the sliding valve 16. The main cylinder body 20 further includes oppositely positioned circular openings 20a which aid in defining the pressure fluid inlet ports 17. The inlet port 17 is formed by placing a seal holder 28 in the opening 20a and connecting same to the main body cylinder 20 by means such as the bolts 29. The seal holder 28 includes an enlarged opening 28a which is adapted to threadedly receive appropriate tubing connections in communication with a pressure fluid source and adapted to conduct pressure fluid therethrough at pressures up to about 3000 p.s.i. A seal 31 is provided between the seal holder 28 and the main cylinder body 20 to prevent leakage through the opening 20a. The interface 28b of the seal holder 28 provides a mounting surface for a plate-like seal member 32 which is connected to the seal holder 28 by means of countersunk bolts indicated at 33. The exposed face 32a is ground and lapped flat to receive a sliding seal ring in leakproof contact therewith as will be explained in more detail hereinafter. It may be appreciated that only one inlet port 17 is involved in operation of the invention, but the embodiment illustrated in the drawings discloses a second inlet port which is identical to the inlet port 17 illustrated on the left hand side of the valve body wherein the second inlet port is temporarily plugged by placing a threaded, solid plug member 34 in the opening 28a of the seal holder 28.

The inlet port 17 that is plugged, and the outlet port that has plug 44 aid in balancing the hydraulic forces present in the valve.

The relief port 19 is formed in somewhat the same manner as the inlet port 17 with a view to forming a leakproof connection between the valve 10 of this invention and a pressure fluid sump system and additionally providing means interiorly of the valve 10 for contact with a sliding seal ring to form a leakproof contact therewith as will be explained hereinafter. A seal holder 38 is positioned in an opening 20b similar to the opening 20a and is bolted to the main cylinder 20 by means such as the bolts 39. A tapped opening 38a is provided in the seal holder 38 and is threadedly engaged with a tubing member 40 which communicates the valve 10 of this invention with a pressure fluid sump for receiving pressure fluid released by operation of the valve in regulating the pressure of the fluid in the pressure fluid receiver. A seal plate 42 is bolted to the interface of the seal holder 38 and is provided with an outer ground and lapped surface for reasons which will become more apparent hereinafter. The valve 10 of this invention is provided with means for multiple connections to the pressure fluid sump as illustrated in FIG. 1 where means are provided on the left-hand side of the figure for connection to the pressure fluid sump as indicated at 19 while similar means provided on the right-hand side of the figure are rendered temporarily inoperative by placing a plug 44 in the outlet port 38a to preevnt the flow of pressure fluid therethrough.

The outlet port 18 is formed longitudinally between the inlet and relief ports 17 and 19, respectively, of the valve body 14 by the drilled and tapped hole 20c which communicates with the inner bore 15 of the valve body 14. The valve 10 is connected to the pressure fluid receiver by appropriate means including the portion of tubing indicated at 45 which is threadedly placed in the tapped opening 20c and which forms a pressure tight seal therein.

The pressure fluid responsive means 12 includes two semicircular housing members 47 and 48 which are relatively similar in shape. The housing member 47 includes a centrally positioned opening 47a and a conduit fitting 49 which is connected to the housing 47 through the opening 47a. The housing member 47 additionally includes a bolt flange 47b which fully encircles the housing 47 and includes appropriately spaced holes 47c for attaching means. The lower housing 48 is similar in form to the upper housing 47 and includes bleed holes 48a which permit the escape of air from the housing 48. The housing 48 is positioned adjacent the housing 47 and connected to the housing 47 utilizing the bolt flange 48b which abuts the flange 47b and the holes 48c which are positioned opposite the holes of the upper housing. The housing 48 is connected by means such as bolts 51 to the top cylinder head 25 to associate the pressure fluid responsive means 12 with the sliding valve 16. A diaphragm 50 made of some appropriate flexible material such as neoprene covered nylon is centered in the fluid pressure responsive means 12 and includes an outer edge 50a which is placed between the flanges 47b and 48b. The diaphragm 50 is folded at 50b to extend away from the low pressure inlet 49, and it has a second fold identified at 50c which extends circumferentially of the diaphragm 50 to define a movable portion 50d adapted to yield in response to pressures acting on the internal face 50e of the diaphragm. The diaphragm is positioned between the flanges of the housing members 47 and 48 and bolt means such as those indicated at 52 are passed through the openings and engaged with the nuts 53 which are tightened to form a leak proof chamber 55 generally defined by the upper housing member 47 and the diaphragm 50.

The slide valve 16 is preferably assembled from two portions which are identified in FIG. 1 as an upper piston 58 and a lower valve 59. The upper piston 58 and the lower valve 59 are preferably formed to the illustrated shapes prior to joinder to form the sliding valve 16 and may be conveniently joined together by means such as threads indicated at 60 for installation. The upper piston 58 is comprised of a major portion 58a which is cylindrical in shape and extends to an enlarged portion 58b which, in cross-section, is generally circular but has four flats or faces of symmetrical size and shape positioned at 90 degree intervals about the circumference of the enlargement 58b. A hole 58c is formed between two of the flats formed on the exterior of the enlargement 58b and communicates with a duct 58d extending axially the length of the piston valve 58 below the enlarged portion 58b. The portion of piston 58 below enlargement 58b is cylindrical.

The lower valve portion 59 has an extension 59a suitably threaded for receiving the lower end 58e of the piston 58 to form the threaded connection 60 as shown in FIG. 2. The duct 58d extends to the lower end 58e of the upper piston 58 as shown in the drawings, and there communicates with a radially extending passage 59b which serves as means communicating the duct 58d with the internal passage 15 below the enlarged portion 58b. The extension 59a of the lower valve portion 59 is centrally positioned on and extends from the cylindrical body 59c but which has symmetrical and parallel flats formed at 90 degree intervals about the outer circumference which are adapted to provide physical clearance for the inlet port seal plates 32.

FIG. 3, which is a sectional view taken through the enlarged portion 59c, illustrates the four flat surface on the lower valve portion 59 relative to the valve body 14 and the inlet port seal plates 32. The flat surfaces on enlarged portion 58b are similar.

For purposes of further identification, two of the flats on the lower valve portion 59 are identified by the numeral 59d and are communicated by means of a passage 59e which is positioned immediately adjacent the radially extending passage 59b. It may be appreciated that the sectional view of FIG. 1 illustrates the passages 59b and 59e as being parallel, whereas the placement of the duct 59b relative to the opening 59e is not critical, and, as a matter of fact, the duct opening 59b for communicating the duct 59b with the internal passage 15 may extend in any direction radially of the slide valve 16.

Considering the enlarged view provided by the sectional drawing of FIG. 3, the means utilized to seal the inlet port 17 are illustrated in the sectional view as including a spring 64 which is positioned in the opening 59e and reacts with equal force on each of two sliding seal rings 66. Each sliding seal ring 66 is hollow and includes an internal beveled shoulder 66a which extends toward the outer surface of the seal ring to define a narrow lip 66b which is adapted to contact the plate seal 32. The hollow seal rings 66 include externally located slots 66c extending about the full circumference of the seal rings 66 and a rubber O-ring 67 is placed in the slots 66c to prevent leakage of pressure fluid along the wall of the hole 59e. The narrow lips 66b of the hollow seal rings 66 are ground and lapped flat to maintain full contact about the circumference of the hollow seals against the plate seals 32 to prevent leakage of pressure fluid from the fluid inlet port 17 into the internal passage 15 of the valve 10. FIG. 3 illustrates that the two seal rings are contacted against the diametrically opposed plate seals 32 to form pressure tight connections against both the seal plates 32 and with the wall of the opening 59e.

A similar seal mechanism is provided for operation relative to the relief port 19 in the diametrically extending bore 58c which communicates two flats on the enlargement 58b of the piston valve 58. A spring 70 urges a pair of oppositely positioned sliding seal rings 72 against the plate seals 42. The seal rings 72 are identical to seal rings 66, except they are smaller. It may be appreciated that the valve mechanism for closing the relief port 19 functions in a manner similar to the valve mechanism associated with the inlet port 17 and in accordance with such similarity, the sliding seal rings 72 are hollow having beveled internal shoulders which define an outwardly extending machined lip on each of the hollow seal rings for cooperation with the plate seals 42 to form a pressure tight connection therewith. Additionally, the sliding seal rings 72 include similar means for receiving rubber O-rings so that fluid may not pass through the openings in the hollow seal rings and thence along the wall of the drilling hole 58c to the internal passage 58b.

A stop ring 75 is centrally positioned in the internal passage 15 of the valve 10 and extends inwardly of the passage as a rest for the seal ring 76 in which suitable O-ring seals are carried. The seal ring 76 is positioned by the stop 75 and the enlargement 58b of the upper piston 48 and serves as a means of preventing the flow of pressure fluid through the valve body 14. The seal ring 76 is seated between the valve body 14 and the sliding valve 16 and the inwardly and outwardly facing slots therein receive O-rings therein to eliminate axial communication along the internal passage 15.

The extreme upper end 58f of the upper valve portion 58 provides means connecting the pressure fluid responsive means 12 to the slide valve 16 to thereby impart movements of the diaphragm 50 to the slide valve 16. The central portion 50e of the diaphragm 50 which is moved by variations of pressure within the chamber 55 defined by the housing 47 and the diaphragm 50 is positioned opposite a rigid support member 80 which is roughly equal in area compared to the area 50e of the diaphragm to provide adequate support thereto for responding to variations in pressure with movement. The support member 80 is connected to the upper end 58a of the piston valve 58 by means of a cylindrical collar or guide 80a which is seated over the upper end 58f of the sliding valve 16. It may be appreciated from the relative sizes of the means illustrated in the drawings that the surface 50e of the diaphragm is materially larger than the effective cross-sectional area of the slide valve 16, and in the preferred embodiment, the ratio of the effective areas is roughly thirty to one whereby an increase or variation of pressure in the fluid pressure responsive means of one p.s.i. requires about thirty p.s.i. variation acting on the opposite end of the sliding valve 16 to offset the variation in the means 12.

Seals are provided between the surfaces of the elements of the valve 10 as illustrated in FIG. 1 to prevent leakage of pressure fluid.

The valve 10 of this invention is particularly suitable for use remote from an operator when it is desired to deliver pressure fluid to a pressure fluid receiver at accurately controlled variable pressures and without requiring the operator to physically attend the valve to vary the regulation thereof. To this end, conductive means 82 are connected to the conduit inlet 49 of the pressure fluid responsive means 12 and extend to some location remote from the valve 10 for connection to controllable pressure fluid source means such as those indicated at 84 in FIG. 4. The means 84 may, in some installations, be comprised of a hand operated regulator valve 84a which is connected to a pneumatic supply line 84b and including pressure indicating means such as the dial 84c.

To further amplify and expand the foregoing explanation, operation of the valve 10 will be explained relative to exemplary situations wherein the initial pressure at the pressure outlet 18 is initially assumed to be quite small in the first example and is assumed to rise above the desired operating pressure range in the second example. The valve 10 is connected to appropriate pressure fluid connections including a pressure fluid source of 3000 p.s.i., the outlet port 18 is connected to a pressure fluid receiver having a preferred operating pressure of 1500 p.s.i., and the port 19 is connected to an appropriate pressure fluid sump system. The conduit connector 49 of the pressure fluid responsive means 12 as shown in FIG. 1 is connected to the conduit means exemplified at 82 (shown in FIG. 4) and thence to a low pressure controllable source which provides an adjustable, controlled pressure level. Utilizing the preferred embodiment discussed herein, the controllable pressure fluid source 84 is adjusted to $\frac{1}{30}$th of the pressure desired in the fluid pressure receiver system connected to the outlet port 18 which would require an adjustment to 50 p.s.i. at the remote source 84.

Figure 4:
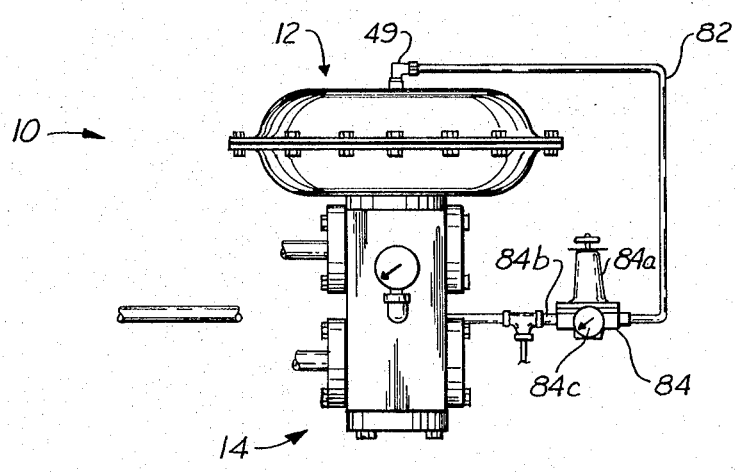
FIG. 4 is a front elevational view of the valve of this invention illustrating one means for supplying control pressure fluid to the valve from a remote location.

The closed system shown in FIG. 4 is connected to the remote, controllable pressure source; the pressure in the closed system and in chamber 55 stabilizes at 50 p.s.i. and this pressure deflects the diaphragm 50 and urges the flat central portion 50e into contact with the circular support 80 positioned in the lower portion of the housing 48. The support 80 is urged by movement of the diaphragm 50 to act on the slide valve 16 which is connected to the support 80 by means of the guide collar 80a on the lower side of the support 80. The slide valve 16 which is positioned in the internal passage 15 of the valve body 14 responds to such movements and movement of the slide valve 16 is limited at the lower end of the valve body 14 by contact with the end plate 22 as is illustrated in FIG. 1. With the sliding valve 16 in the position illustrated in FIG. 1 relative to the valve body 14, the inlet port 17 is exposed to the internal passage 15 of the valve 10 whereby pressure fluid may be admitted through the passage 17 and through the opening in the plate seal 32. Pressure fluid is admitted through the inlet port 17 and flows through the outlet port 18 to build pressure in the pressure fluid receiver to 1500 p.s.i. When pressure at the pressure fluid receiver reaches 1500 p.s.i., the internal passage of the valve 10 which is in communication therewith is also pressurized to 1500 p.s.i. and acts to exert a force on all surfaces confining the pressure fluid. Pressure fluid continues to flow through the inlet port 17 and to raise the pressure level of the internal passage 15 until a differential force acting on the slide valve 16 moves the valve upwardly (as shown in FIG. 1) to close off the inlet port 17. As viewed in FIG. 1, the upward movement of the valve 16 relative to the inlet port 17 positions the machined lip 66b of the sliding seal rings in an encircling position about the openings in the plate seals 32.

In the preferred embodiment, and by way of example only, when the pressure in passage 15 reaches 1500 p.s.i., the valve 16 will move as above described to close off inlet 17. It may be appreciated from the foregoing that the pressure ring seal positioned adjacent the plugged inlet port likewise forms a pressure tight seal so that the pressure fluid source is closed off from the pressure fluid outlet 18.

In this position, the inlet port 17 is sealed off from communication with the outlet port 18 when pressure in the fluid pressure receiver reaches 1500 p.s.i. The pressure fluid in the internal passage 15 of the valve body 14 passes through the radially extending passage 59b and into the axially extending duct 58d and chamber or passage 58c. The seal ring 76 prevents pressure fluid from flowing axially in the internal passage 15. The sliding seal rings 72 abutting against the seal plates 42 prevent the leakage of pressure fluid from opening 58c to the relief port 19. As previously mentioned, the sliding seal rings 72 are sealed within chamber 58c to prevent leakage.

In the preferred embodiment, frictional forces at work within the valve limiting motion of the slide valve 16 longitudinally of the internal passage 15 and the resiliency of the diaphragm 50 may be controlled so that the range of pressure variations allowed in the pressure fluid receiver are known. In the preferred embodiment, pressure of the fluid at the pressure fluid receiver increases 75 p.s.i. before fluid is bled from the valve 10 through the outlet port 19 to the pressure fluid sump.

For example, when the pressure in the pressure fluid receiver reaches 1575 p.s.i. (due to outside forces acting thereon which are not pertinent to this invention), the slide valve 16 is urged upwardly so that passage 58c communicates outlet 19 and passage 58d. Pressure fluid flows through the duct port 59b, the duct 58d, the chamber 58c and through the outlet port 19 until a reduction in pressure in the pressure fluid receiver is achieved to cause an unbalance or differential of forces acting on the slide valve 16. The net force applied to the slide valve 16 which is created by the pressures working on the diaphragm 50 and on the effective cross-sectional area of the lower end of the slide valve 16 reposition the valve to close off communication through the relief port 19 after pressure in the valve body drops below 1500 p.s.i. It may be appreciated that the degree of communication through the outlet port 19 depends on the rapidity with which the outlet pressure rises above the sump pressure so that a slight increase of pressure above 1575 p.s.i. communicates the sliding seal ring 72 only slightly with the opening in the seal plate 42.

From the foregoing examples, it is believed that the combination pressure reducing and relief regulator valve 10 of this invention has been exemplified in operation as providing a sensitive valve having long term repeatability in operation which may be connected in a pressure fluid system for delivering pressure fluid to a receiver at a pressure which may be adjusted from remote locations by variation of a low pressure pneumatic system. The valve 10 of this invention is very accurate when considered over valves of the prior art due to the fact that the differential forces acting on the sliding valve 16 are formed by pressure fluids acting on the effective cross-sectional area of the lower end of the valve 16 and acting on the diaphragm 50 of the fluid pressure responsive means 12. The springs 64 and 70 need only provide a minimum force for holding leak proof seals between the seal plates and the associated sliding seal rings and the springs may be considerably stronger than the minimum strength required so that replacement of those springs is seldom, if ever, required.

Alterations may be incorporated in the invention without departing from the invention disclosed herein.

Broadly, this invention relates to a combination pressure reducing and relief regulator valve which is very accurate in operation over a long period of time and which may be adjustable from remote locations utilizing a low pressure pneumatic system to control the setting of the valve when installed in a high pressure system.

What is claimed is:

A combination fluid pressure reducing and relief regulator valve operable to supply pressure fluid from a source to a pressure fluid receiver at a pressure related to a control pressure comprising:

(a) a valve body having an internal passage and an open and closed end, (b) an inlet port communicating with said passage adjacent said closed end, said inlet port communicating with the pressure fluid source, (c) an outlet port communicating with said passage, said outlet port communicating with the pressure fluid receiver, (d) a relief port communicating with said passage and communicating with a pressure fluid sump, said outlet port being mounted between said inlet and relief ports, (e) a slide valve having two ends adapted to be slidably positioned in said passage, one of said ends adjacent said inlet port being exposed to pressure fluid in the passage and the other of said ends being positioned adjacent said open end of said open end of said valve body, (f) seal means adapted to be positioned about the slide valve in said passage to prevent communication along said passage between said outlet and relief ports, (g) duct means in said slide valve terminating in openings at each end thereof with said openings located to bypass said seal means, (h) second seal means mounted in said slide valve adapted to be positioned relative to said inlet port to close said port, (i) third seal means mounted in said slide valve adapted to be positioned in said duct means opening to prevent communication of pressure through said duct means except when said duct means opening is positioned by said slide valve to communicate with said relief port, (j) pressure fluid responsive means mounted with said end of said slide valve adjacent said open end of said valve body and including:

(1) a housing for containing pressure fluid, (2) one portion of said housing being formed of a yieldable material, said portion being much larger in area than the end of the slide valve, (3) movable means positioned adjacent the yieldable portion, said means having an area substantially equal to the area of the yieldable portion,
(4) means on said movable means for sliding said slide valve in said internal passage against pressure fluid therein in response to pressure fluid within said housing, and
(k) a controllable pressure fluid source connected to said pressure fluid responsive means for varying the position of said slide valve to thereby vary the pressure of pressure fluid within said valve body.

References Cited by the Examiner

UNITED STATES PATENTS

| | | | |
|---|---|---|---|
| 2,690,190 | 9/1954 | Farrell | 137—102 |
| 2,788,192 | 4/1957 | Mountford | 137—505.18 XR |
| 2,859,763 | 11/1958 | Fites | 137—102 |
| 2,959,189 | 11/1960 | Natho | 137—625.43 XR |

FOREIGN PATENTS 571,863  11/1960  Canada.

WILLIAM F. O'DEA, *Primary Examiner.*

D. J. ZOBKIW, *Assistant Examiner.*